United States Patent [19]

Bently

[11] 4,033,042
[45] July 5, 1977

[54] SHAFT ALIGNMENT APPARATUS AND METHOD

[75] Inventor: Donald E. Bently, Minden, Nev.

[73] Assignee: Bently Nevada Corporation, Minden, Nev.

[22] Filed: Feb. 17, 1976

[21] Appl. No.: 658,293

Related U.S. Application Data

[63] Continuation of Ser. No. 513,726, Oct. 10, 1974, abandoned.

[52] U.S. Cl. .............................................. 33/181 R
[51] Int. Cl.[2] ......................................... G01B 7/31
[58] Field of Search ............... 33/84, 181 R, 180 R, 33/182, 174 L; 324/34 PS, 34 D

[56] References Cited

UNITED STATES PATENTS

| | | | |
|---|---|---|---|
| 2,846,857 | 8/1958 | Hagenlocher | 64/13 |
| 3,638,453 | 2/1972 | Ehret | 64/9 R |
| 3,783,522 | 1/1974 | Dodd | 33/181 R |

*Primary Examiner*—Harry N. Haroian
*Attorney, Agent, or Firm*—Flehr, Hohbach, Test, Albritton & Herbert

[57] ABSTRACT

Alignment apparatus and method for aligning a pair of machines having first and second rotating shafts in a machine train with at least one flexible coupling interconnecting the first and second shafts. The flexible coupling has at least one member connected to one of the shafts and is capable of accommodating at least some misalignment of the first and second shafts. One of the first and second shafts is considered as a reference shaft and the other of said first and second shafts is considered as a movable shaft. Means is carried by the shafts having surfaces spaced apart circumferentially with respect to the axis of rotation of the shafts which represent the orientation of one of said shafts and serve as reference surfaces. Paddle means is carried by the flexible coupling and has surfaces spaced apart circumferentially with respect to the axis of rotation of the shafts and representing the orientation of the one member of the flexible coupling. Probe means is provided for sensing the position of the reference surfaces and the last named surfaces to provide information on the gap or spacing between the probe means and the surfaces. The information supplied by the probe is utilized for giving an indication of the axial motion of the machines, both steady state and dynamically and both relatively and absolutely. In addition, the apparatus provides net coupling hub motion of each machine due to any dynamic motion of each rotor, such as that due to fixed bows, thermal bows, unbalance bows and other action at rotative speed in a forward direction and also that due to any other action at other than rotative speed in a forward direction such as oil whirl, reexcitation of balance resonances and other actions that create shaft motions.

31 Claims, 13 Drawing Figures

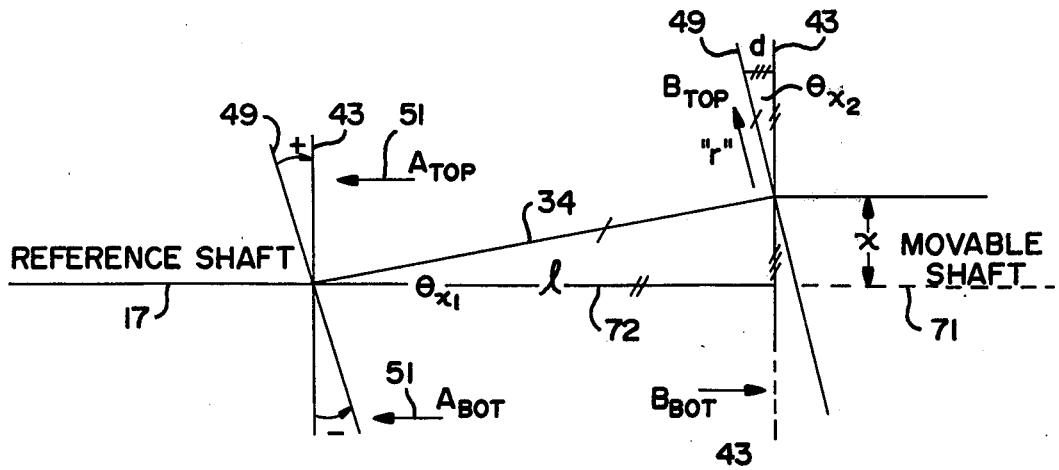

(1) $\theta_{x_1} \cong \dfrac{x}{\ell}$ FOR SMALL $\theta_{x_1}$ (2) $\theta_{x_2} \cong \dfrac{d}{r}$ FOR SMALL $\theta_{x_2}$ (3) $\dfrac{x}{\ell} \cong \dfrac{d}{r}$ (4) $x \cong \dfrac{\ell}{r} d$ TAKE AVERAGE d (5) $d_{AVE} = -1/4 (A_{TOP} + B_{BOTTOM} - B_{TOP} - A_{BOTTOM})$ (6) $x \begin{bmatrix} MILS \\ PARALLEL \\ ALIGNMENT \end{bmatrix} = \dfrac{\ell}{4R} (A_{TOP} + B_{BOTTOM} - B_{TOP} - A_{BOTTOM})$

FIG. 4

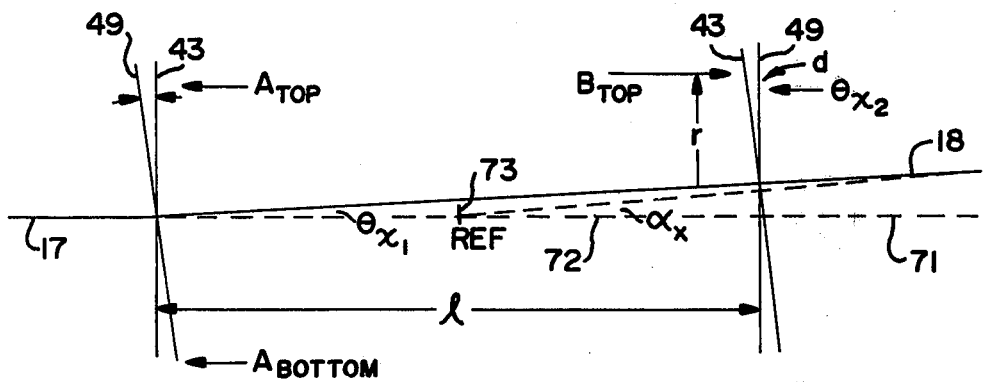

(7) $\theta_{x_1} = \dfrac{x}{\ell}$ (8) $\alpha_x \cong \dfrac{2x}{\ell} \cong 2\theta_{x_1}$ FOR SMALL $\alpha_x$ & $\theta_{x_1}$ (9) $\theta_{x_2} \cong \dfrac{d}{r}$ FOR SMALL $\theta_{x_2}$

(10) $\alpha_x = \dfrac{2d}{r}$

(11) $\alpha_x \dfrac{MIL}{ft.} = \dfrac{24 d}{r}$

(12) TAKE AVE. d $\quad d_{AVE.} = -1/4 (A_{TOP} + B_{TOP} - A_{BOTTOM} - B_{BOTTOM})$

(13) $\alpha_x = \dfrac{6d}{r} (A_{TOP} + B_{TOP} - A_{BOTTOM} - B_{BOTTOM})$

(19) $W_{AVE} = -1/4 (A_{TOP} + A_{BOTTOM} + A_{LEFT} + A_{RIGHT})$

(20) $U_{AVE} = -1/4 (B_{TOP} + B_{BOTTOM} + B_{LEFT} + B_{RIGHT})$

(21) $Z(STRETCH) = -1/4 (A_{TOP} + B_{TOP} + A_{BOTTOM} + B_{BOTTOM}$
$A_{RIGHT} + B_{RIGHT} + A_{LEFT} + B_{LEFT})$

(14) $e = X + \alpha x \cdot a$

(15) $f = X + \alpha x \cdot b$

(16) $g = Y + \alpha y \cdot a$

(17) $h = Y + \alpha y \cdot b$

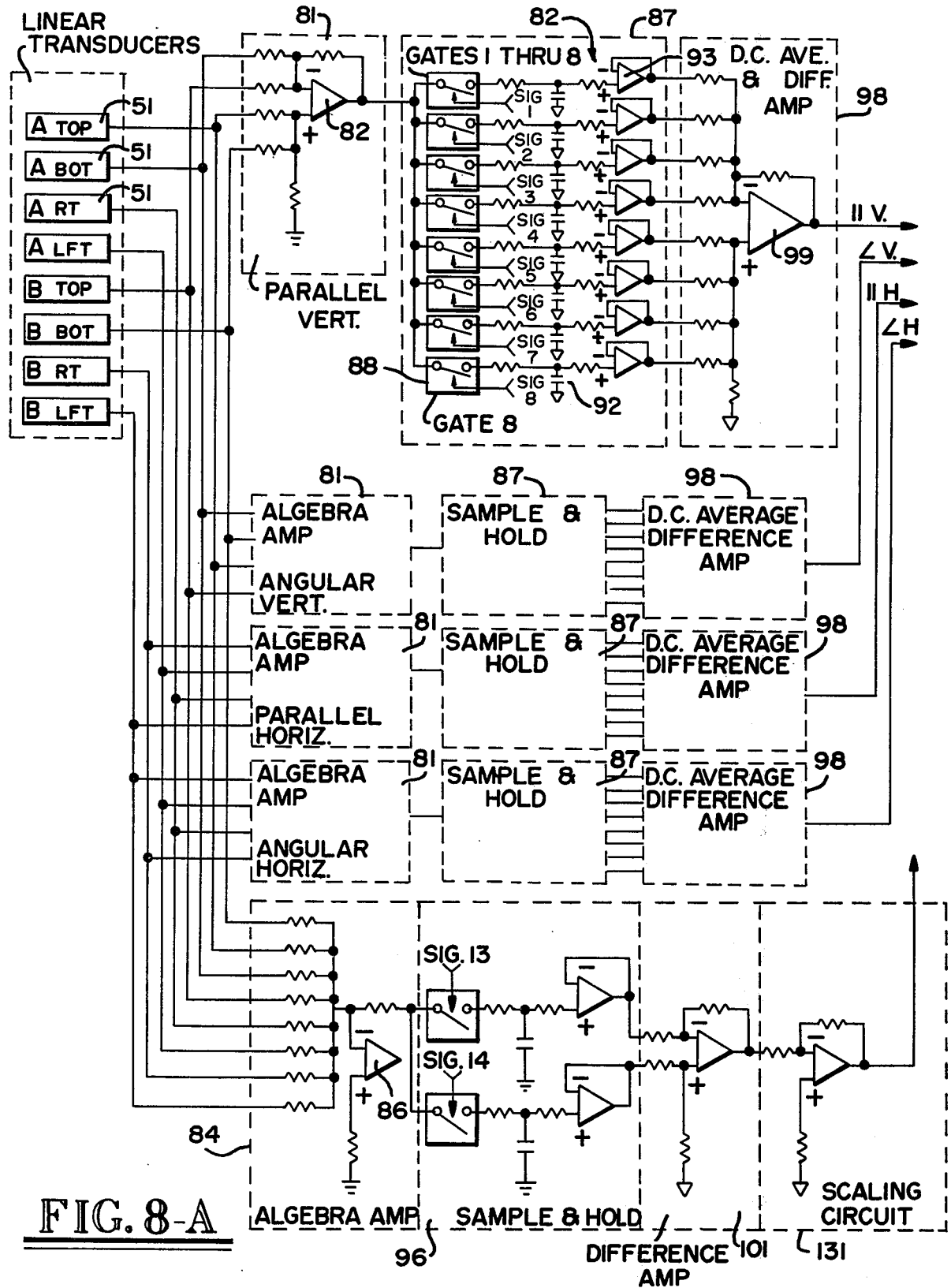
FIG. 8-A

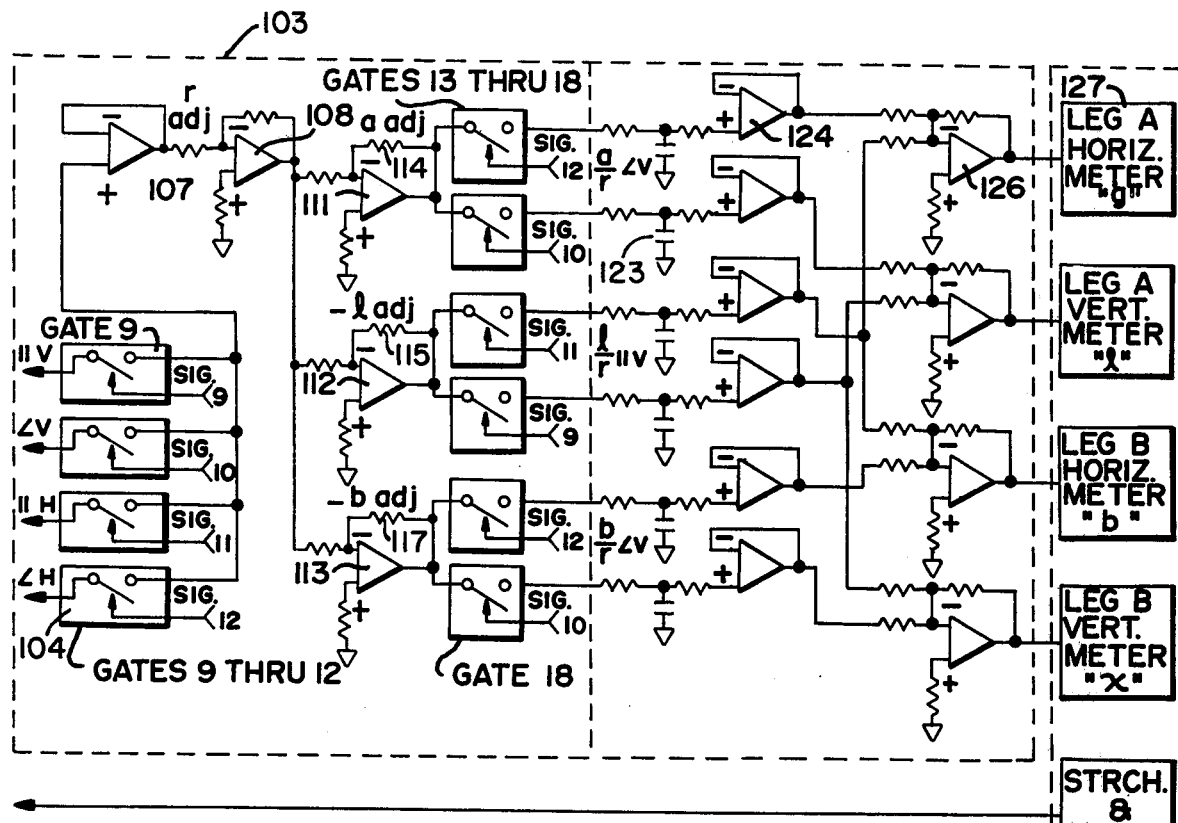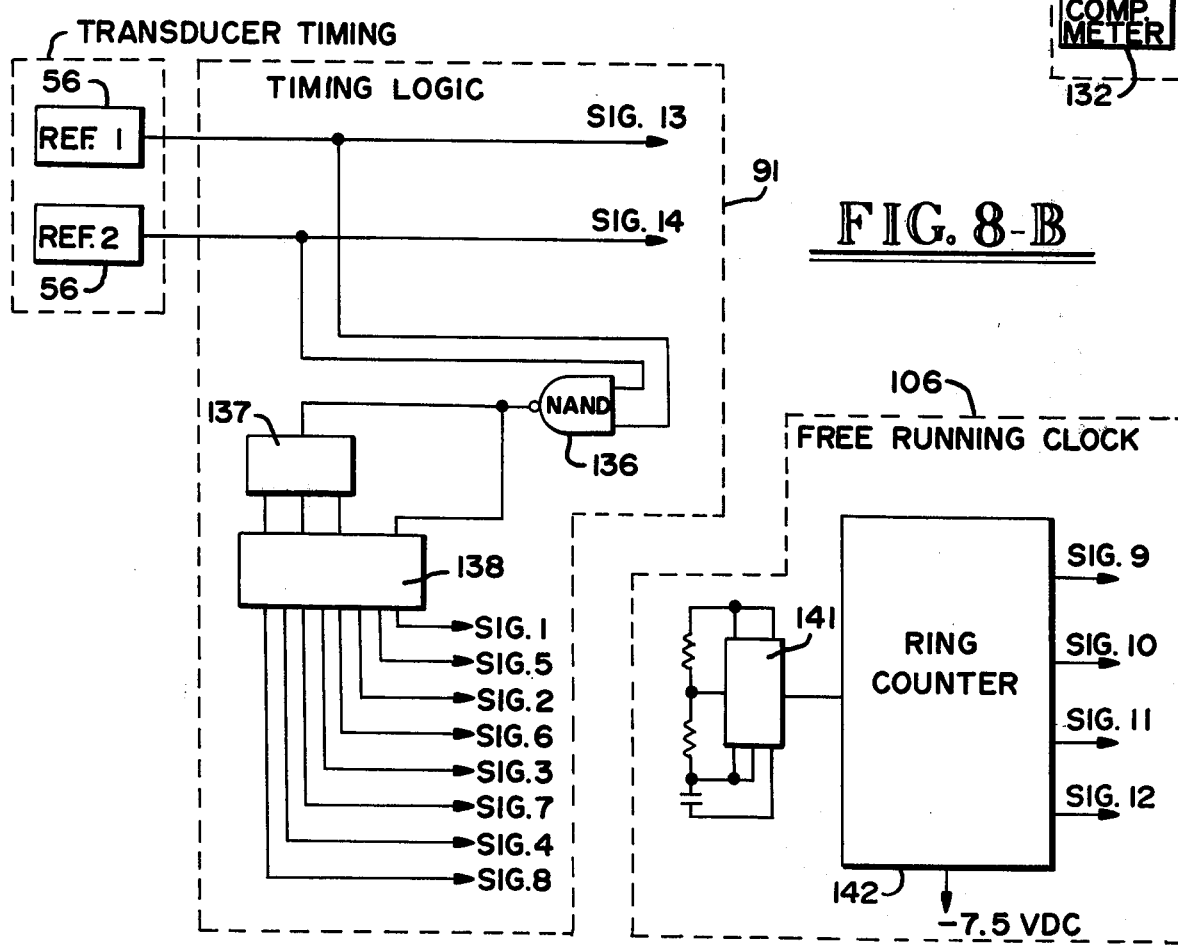
FIG. 8-B

SHAFT ALIGNMENT APPARATUS AND METHOD

This is a continuation, of application Ser. No. 513,726 filed Oct. 10, 1974 now abandoned.

BACKGROUND OF THE INVENTION

Different types of methods and apparatus have been utilized for aligning machines having rotating shafts with flexible couplings connecting the rotating shafts. These prior art apparatus and methods have numerous disadvantages and have been unsatisfactory for a variety of reasons. There is, therefore, a need for a new and improved shaft alignment apparatus and method.

SUMMARY OF THE INVENTION AND OBJECTS

The alignment apparatus is for a pair of machines in a machine train having first and second rotating shafts interconnected by a flexible coupling. The flexible coupling has a least one member connected to one of the shafts which is capable of accommodating at least some misalignment of the first and second shafts. One of the first and second shafts is considered as a reference shaft and the other of said first and second shafts is considered as a movable shaft. Means is carried by the shafts having surfaces spaced apart circumferentially with respect to the axis of rotation of the shafts which represent the orientation of one of said shafts and serve as reference surfaces. Paddle means is carried by the flexible coupling and has surfaces spaced apart circumferentially with respect to the axis of rotation of the shafts and representing the orientation of the one member of the flexible coupling. Non-contact probe means is provided for sensing the positions of the reference surfaces and the last named surfaces to provide information on the spacing or gap between the probe means and the surfaces to ascertain whether said shafts are placing on said member a force which is outside of the useful operating range of the member in the flexible coupling.

In general, it is an object of the present invention to provide a shaft alignment apparatus and method which is particularly useful for aligning any pair of machines having rotating shafts in a machine train with a flexible coupling interconnecting the shafts.

Another object of the invention is to provide an apparatus and method of the above character in which measurements can be carried with the machines at rest, during start-up and during all running conditions and on shut-down.

Another object of the invention is to provide an apparatus and method of the above character in which measurements can be made giving an indication of the axial motion of the machines, both steady state and dynamically.

Another object of the invention is to provide an apparatus and method of the above character in which the measurements which can be provided include the net coupling hub motion of each machine due to any dynamic motion of each rotor, such as that due to fixed bows, thermal bows, unbalanced bows and other action at rotative speed in a forward direction and also due to any other action at other than rotative speed in a forward direction such as oil whirl, reexcitation of balance resonances and other actions that create shaft motions.

Another object of the invention is to provide an apparatus and method of the above character in which readings are provided making it possible to align the machine pair or train properly before start-up in parallel alignment, angular alignment and axial spacing.

Another object of the invention is to provide an apparatus and method to provide measurements which yield the condition of the alignment with respect to the above three identified parameters plus the dynamic tiltings of the coupling hubs on start-up and initial running condition of the machine pair at initial start-up and at subsequent start-ups.

Another object of the invention is to provide an apparatus and method of the above character which makes it possible to make measurements which will provide warning of the deterioration of the alignment of the machines so that the machines may be stopped and/or the performance parameters changed in such a manner so as to keep the coupling parameters within certain limits.

Another object of the invention is to provide an apparatus and method of the above character in which the information obtained can be utilized to provide automatic warning and shut-down of the machines.

Another object of the invention is to provide an apparatus and method of the above character in which the information obtained can be utilized for maintaining alignment between machines within allowable ranges.

Another object of the invention is to provide an apparatus and method of the above character which can be utilized with various types of flexible couplings such as diaphragm-type flexible couplings and gear-type flexible couplings.

Another object of the invention is to provide an apparatus and method of the above character which can be utilized in conjunction with equipment which has already been installed.

Another object of the invention is to provide an apparatus and method of the above character which will give to actual misalignment of both legs of a movable machine with respect to a reference machine.

Another object of the invention is to provide an apparatus and method of the above character which will give a visual readout of such information.

Another object of the invention is to provide an apparatus and method of the above character in which the misalignment information given includes parallel misalignment of the shafts, angular misalignment of the shafts, and compression and stretch of the flexible coupling.

Another object of the invention is to provide an apparatus and method of the above character which makes it possible to ascertain whether or not a member of the flexible coupling is operating within its usable range.

Additional objects and features of the invention will appear from the following description in which the preferred embodiments are set forth in detail in conjunction with the accompanying drawings.

BRIEF DESCRIPTION OF THE DRAWINGS

FIG. 4 is a diagrammatic illustration of a pure parallel shaft misalignment situation, the misalignment being greatly exaggerated for purposes of illustration.

FIG. 5 is a diagrammatic illustration of a pure angular shaft misalignment situation with the misalignment being greatly exaggerated for purposes of illustration.

FIGS. 8A and 8B are a circuit diagram, a portion of which is in block form, of the electronics utilized in the apparatus for providing a visual readout of the actual measurements representing misalignment of both legs of the movable shaft.

BRIEF DESCRIPTION OF THE PREFERRED EMBODIMENTS

Figure 1:
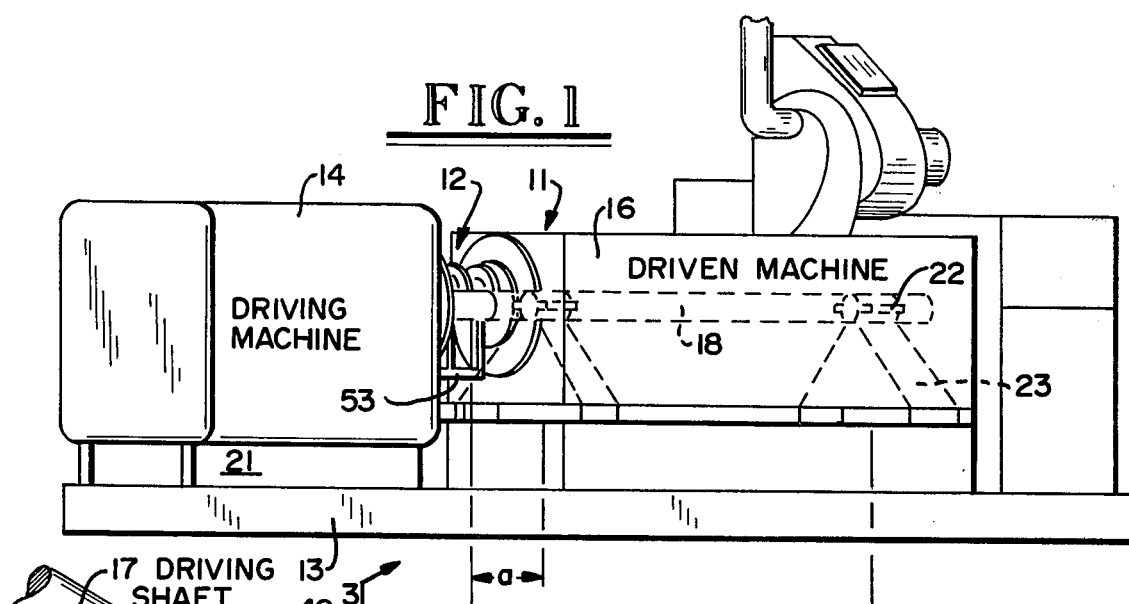
FIG. 1 is a perspective view of a pair of machines having rotating shafts in a machine train interconnected by a flexible coupling and having an alignment apparatus incorporating the present invention associated therewith.

A machine train 11 having mounted thereon a shaft alignment apparatus 12 incorporating the present invention is shown in FIG. 1 of the drawings. The machine train 11 is mounted upon a suitable rigid base or foundation 13. The machine train 11 mounted therein comprises at least a pair of machines with one of the machines being a fixed or driving machine 14 and the other of the machines being a movable or driven machine 16. By way of example, the fixed or driving machine 14 can be in the form of an electric motor driving a movable or driven machine 16 such as a generator, air compressor or the like. The fixed or driving machine 14 is provided with a fixed or driving shaft 17, whereas the movable or driven machine 16 is provided with a movable or driven shaft 18. A flexible coupling 19 is provided for interconnecting the movable or driven shaft 18 with the fixed or driving shaft 17.

In aligning the two shafts 17 and 18 with the flexible coupling 19 therebetween, it is generally desirable to consider one of the machines and its shaft to be fixed and a reference and to consider the other machine as being movable so that its shaft can be brought into alignment with the reference shaft of the fixed machine. Thus, by way of example, as shown in FIG. 1, the fixed or driving machine 14 can be considered as fixed to the base 13 and as shown in FIG. 1 is rigidly secured to the base 13 by supports or frame members 21 which can be welded or bolted to the base 13. Conversely, the movable or driving machine 17 is movably mounted upon the base 13 by conventional means not shown.

As can be seen from FIG. 1, the movable or driven machine 16 has a shaft 18 with a finite length which is supported at opposite ends by bearings 22 mounted upon pedestals 23 that are secured to the base 13 by securing means in a suitable manner so as to permit shifting of the pedestals axially of the shaft 18 and vertically and horizontally on the base 13. Securing means of this type is well known to those skilled in the art, and thus is not shown in the drawings. Typically, it can consist of mounting pads having bolts and screws extending therethrough in which screws can be utilized for obtaining the desired positioning and bolts are then used to secure the pedestals 23 in the desired positions. Similarly, jack screws can be provided for shifting the pedestals 23 axially of the shaft 18.

Figure 2:
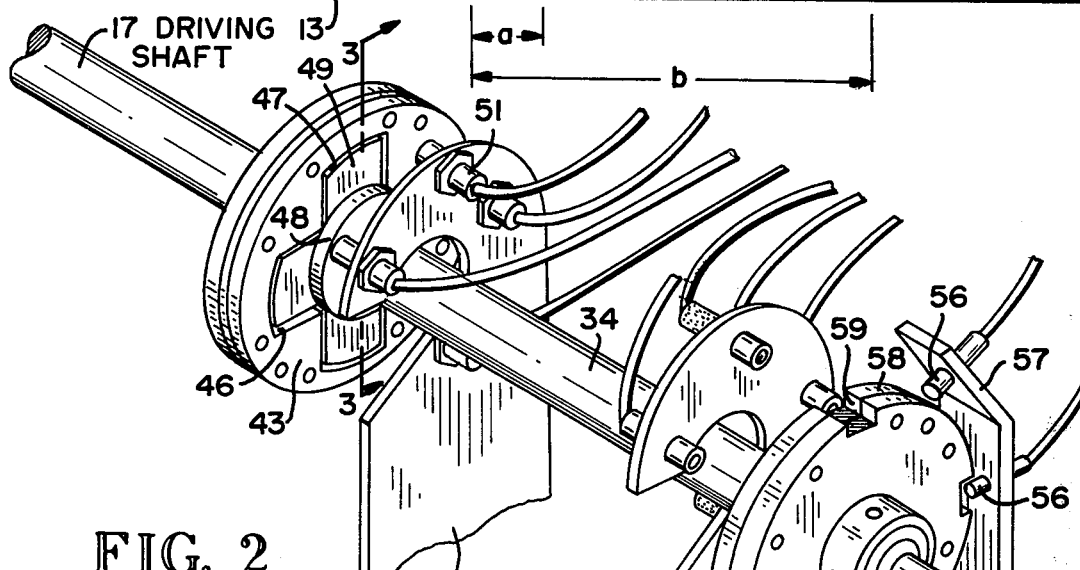
FIG. 2 is an enlarged isometric view of a portion of the apparatus shown in FIG. 1 and particularly shows a flexible coupling with the alignment apparatus associated therewith.
Figure 3:
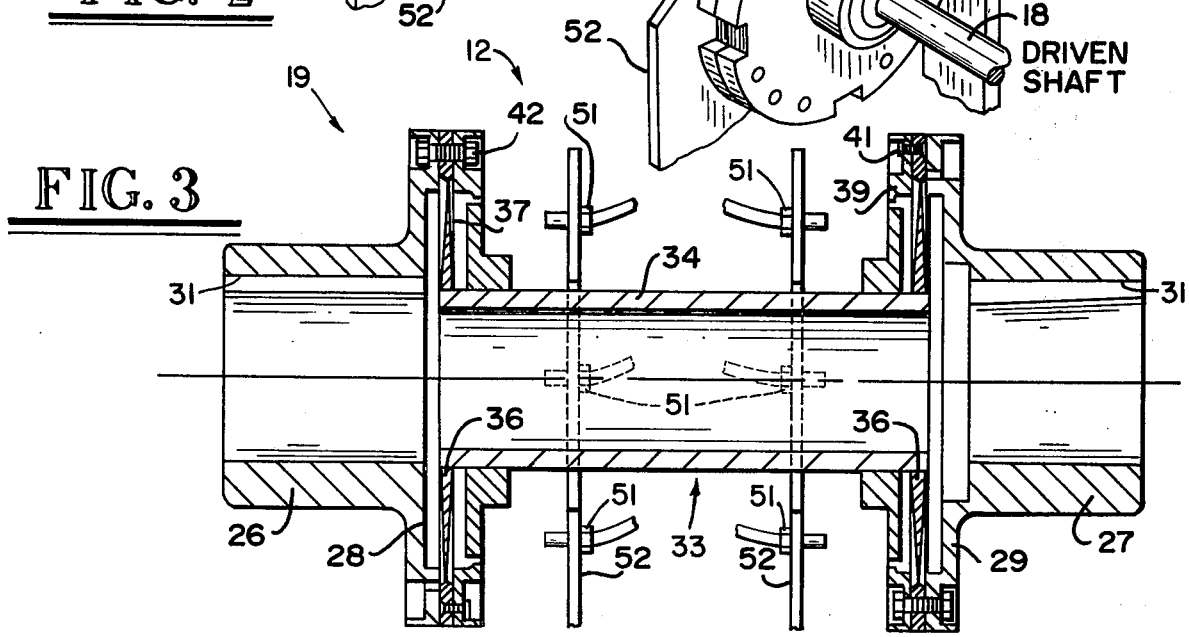
FIG. 3 is a cross-sectional view taken along the line 3—3 of FIG. 2.

The flexible coupling 19 can be of any suitable type as, for example, one of a flexible diaphragm type or of the gear type. A flexible coupling of the flexible diaphragm type is shown in FIGS. 1 and 2 of the drawings and as shown therein consists of first and second hubs 26 and 27 having radially extending flanges 28 and 29 mounted thereon. The hubs 26 and 27 are provided with bores 31 which are adapted to receive mating shafts. Thus, as shown in FIGS. 1 and 2 of the drawings, the hub 26 is mounted on the fixed or driving or reference shaft so that the hub face is flush with the end of the shaft. The hub 26 is secured to the shaft by suitable means such as a key (not shown). Similarly, the hub 27 is mounted on the driven or movable shaft 18 and is keyed thereto in such a manner that the face of the hub is flush with the end of the shaft. The faces of the flanges 28 and 29 face each other and have a spacing therebetween for receiving the flexible coupling 19. This spacing, for purposes hereinafter described, is identified as "1."

A flex unit spacer or spool 33 forms a part of the flexible coupling and is mounted in the space between the flanges 28 and 29. The flex unit spacer or spool 33 consists of a center tube 34 which can be identified as a torque tube which is in the form of a hollow cylinder. The outer extremities or ends of the center tube 34 are mounted in openings 36 centrally disposed in circular or disc-like diaphragms 37. The center tube 34 is secured to the diaphragms 37 by suitable means such as welding. The outer margins of the diaphragms 37 are secured to the outer margins of guards 39 by suitable means such as rivets 41. The guards 39 with the diaphragms 37 secured thereto are secured to the flanges 28 and 29 by bolts 42. Th guards 39 are provided with outwardly facing planar reference surfaces 43 which are generally perpendicular to the axes of rotation of the shafts 17 and 18.

Each of the guards 39 has been provided with a plurality of cut-outs 46 which extend radially from the center tube 34. The cut-outs 46 are of substantial width and are placed in four quadrants which are spaced 90° apart for purposes hereinafter described. A paddle 47 is disposed in each of the cut-outs 46 of the guards 39. The paddles 47 are secured to and are mounted upon the center tube 34 so that they have a precise relationship with respect to the tube 34. The paddles 47 are relatively precisely formed such as by machining and are mounted upon a collar 48 which is secured to one end of the tube 34 by suitable means such as welding. The paddles 47 provided on both ends of the center tube 34 are in alignment with each other whereby two corresponding paddles on opposite ends have the same angular relationship with respect to the axis of rotation of the center tube 34.

To accomplish the functions hereinafter described, it is necessary that the paddles 47 have outer planar surfaces 49 which are perpendicular to the axis of rotation of the tube 34 so that the surfaces 49 provide information as to the orientation of the ends of the center tube 34 to which they are attached. When the fixed or driving shaft 17 and the movable or driven shaft 18 are in substantially perfect alignment, that is, they have no parallel or angular misalignment and there is no axial stretch or compression of the flexible coupling, the outer surfaces 49 should be flush with the surfaces 43 of the guards 39. As hereinafter described, the surfaces 43 serve as reference surfaces for ascertaining the relative positions of the planar surfaces 49 carried by the paddles 47.

Means is provided for detecting the positions of the surfaces 43 and 49 and consists of probe means in the form of four separate probes 51 which are also positioned in four quadrants. The probes 51 are mounted in a suitable manner such as by placing the same in a mounting yoke 52. As shown in FIG. 2, the mounting yokes 52 are supported in a suitable manner in a fixed position by a bracket 53 which is secured to the fixed or reference machine 16. It should be appreciated that, if desired, the yokes 52 could be supported upon pedestals mounted upon the base 13. Alternatively, one of the yokes could be secured to the fixed or reference machine, whereas the other yoke adjacent to the driven or movable machine can be secured to the movable machine.

The probes 51 are non-contact type proximity detectors and are mounted so as to have suitable spacings or gaps between the probes and the surfaces 43 and 49 as, for example, 40 to 60 milliinches. One type of probe found to be particularly satisfactory is the Bently non-contacting eddy current probe manufactured by The Bently Nevada Corporation of Minden, Nev. Such a probe is a gap to voltage transducer and measures the distance to any conductive material. The actual transducer in the probe is a flat coil of wire located on the end of a ceramic trip. The probe is driven by an RF voltage and provides a signal output which is a voltage proportional to the gap distance between the probe and the observed surface. If there is no conductive material to intercept the magnetic field, there is no loss of RF signal. When a conductive surface approaches the probe tip, eddy currents are generated on the surface of the material and power is absorbed. Circuitry is provided which measures the RF voltage envelope and provides a d.c. signal output equal to the negative peaks of the envelope. The output from the circuitry driving the probe provides an average d.c. voltage which gives the average gap distance.

Timing means is provided for ascertaining when the probes 51 are looking at the surfaces 43 and when they are looking at the surfaces 49. As shown on the drawings, such means consists of a pair of timing probes 56 which are carried by a mounting bracket 57 also mounted upon the bracket 53. As will be noted from the drawings, the timing probes 56 are positioned in such a manner so that they can view the circumferential peripheral surface 58 on one end of the flexible coupling 19. A plurality of notches 59 are formed in the parts forming the end of the coupling including the flanges 28 and 29, the diaphragm 37 and the guard 39. The notches extend in a direction which is axial of the center tube 34 and have a finite width. Each of the notches is positioned so that it is in alignment with the center of a paddle 47. Thus, since four paddles have been provided, four notches 59 have been provided. It will be noted that the timing probes 56 have been spaced approximately 45° apart so that when one of the timing probes is seeing notch 59, the other of the timing probes is viewing a portion of the peripheral surface 58 which is free of a notch.

Figure 7:
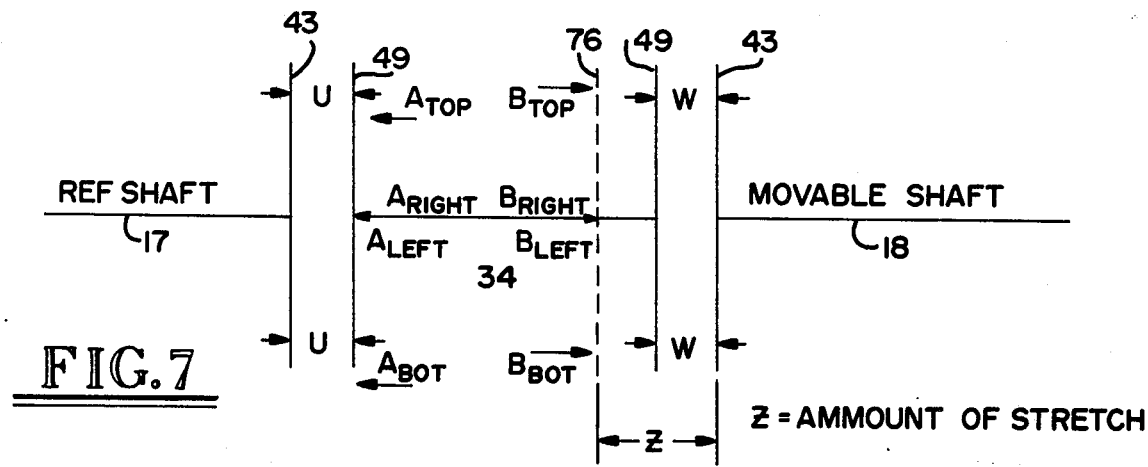
FIG. 7 is a diagrammatic illustration showing stretch and compression of the flexible coupling in an axial direction with the distortion being greatly exaggerated for purposes of illustration.
Figure 6:
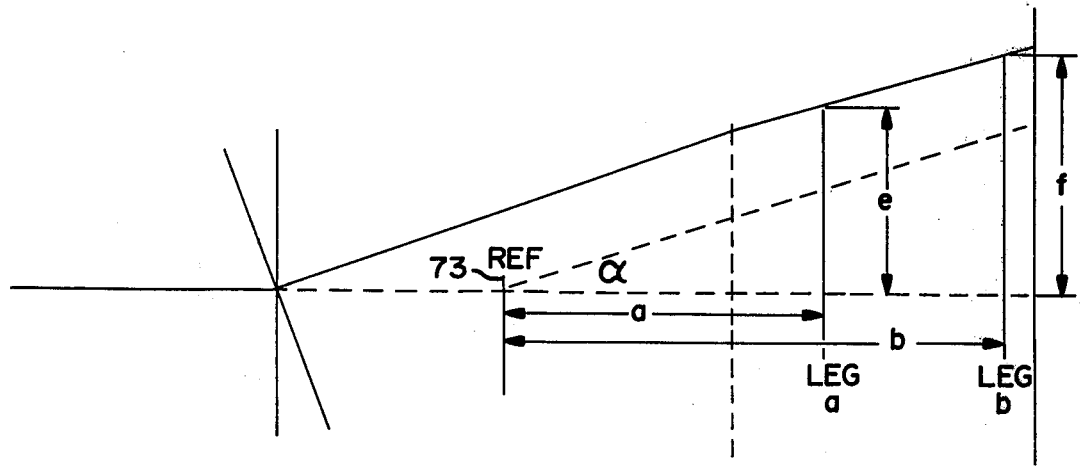
FIG. 6 is a diagrammatic illustration showing the manner in which parallel misalignment and angular misalignment of the shafts are combined to provide the actual misalignment of the movable shaft with respect to the reference shaft with the actual amounts of misalignment for both the legs of the movable shaft.

In order to understand the present method and the method of operation of the alignment apparatus, reference is now made to FIGS. 4, 5 and 6. FIG. 4 is a diagrammatic illustration of a pure parallel misalignment situation in a vertical plane in which the misalignment has been greatly exaggerated for purposes of illustration. FIG. 5 is a similar diagrammatic illustration for pure angular misalignment in a vertical plane and FIG. 7 is a similar illustration for stretch and compression in an axial direction.

Returning to FIG. 4, the various parts of the machine train have been labelled such as the reference shaft 17 and the movable shaft 18. Similarly, the reference surfaces 43 have been identified as have the paddle surfaces 49. The letter $l$ denotes the length of the spool or center tube 34 from diaphragm to diaphragm. The letter $r$ represents the probe mounting radius which is the distance from the axis of rotation of the reference shaft 17 to the center of the probe 51. The letter $x$ represents the amount of parallel misalignment of the movable shaft 18 in mils from its theoretical perfectly aligned position which is represented by the broken line 71. The letter $d$ represents the differential measurement between the paddle surface 49 and the reference surface 43. The angle $\theta_{x_1}$ represents the angle between the axis of rotation of the spool piece or center tube 34 and the axis of rotation of the spool piece or center tube 34 in a theoretically aligned position as represented by the broken line 72.

The arrows shown in FIG. 4 represent probes 51 which are looking at the reference surfaces 43 and the paddle surfaces 49. The probes 51 which are looking at one end of the flexible coupling are designed as A type probes, whereas the probes looking at the other end of the flexible coupling are designated B type probes. Thus the probes 51 shown in FIG. 4 have been designated as "A top" and "A bottom," "B top" and "B bottom." It should be appreciated that as hereinbefore described there are four probes provided for each end of the flexible coupling. The other two probes on each end can be designated as right and left probes with the right probe corresponding to the top probe and the left probe corresponding to the bottom probe. In order to ascertain the right and left probes, it is assumed that one is standing in the position of the fixed machine and looking down on the machine train toward the movable machine.

In examining FIG. 4, it will be noted that plus and minus signal have been placed between the surfaces 43 and 49. These designations have been arbitrarily chosen but have been selected to make possible consistency in the mathematical calculations which are hereinafter set forth. For purposes of illustration, a displacement of the paddle surface 49 with respect to the reference surface 43 in a direction away from the probe has been considered to be positive and in a direction toward the probe has been considered to be negative.

For purposes of analyzing the trigonometry which is involved in the present method, it has been assumed that the angle $\theta_{x_1}$ for all practical purposes is very small, i.e., ranging from zero to 5°, so that the approximation of $\theta_{x_1}$ in radian measurement is approximately equal to $x/l$ as shown by equation 1. By the theory of similar triangles, it can be seen that the angle $\theta_{x_2}$ between the paddle surface 49 and the reference surface 43 is identical to the angle $\theta_{x_1}$ which is the angle between the axis of the center tube 34 and its theoretically aligned axis 72. The two triangles are similar from a corollary. Since all three sides of the triangles are perpendicular to their corresponding sides as indicated by conventional geometrical notation shown in FIG. 4, the triangles are similar. Thus as shown in equation 2, $\theta_x$ is approximately equal to $d/r$.

Since $\theta_{x_1}$ equals $\theta_{x_2}$, equation 3 can be written. Solving for $x$ as shown in equation 4, we find that $x = l/r \cdot d$. An average $d$ is ascertained by taking an average of the four measurements which are shown in FIG. 4. The signs of these measurements have been taken from the assumptions previously made.

After d average has been ascertained, this figure is inserted into equation 4 to solve for $x$ and to give $x$ mils of parallel misalignment in a vertical direction. This calculation is shown in equation 6 in which ¼ represents a scale factor which is a constant for a particular flexible coupling in a machine train. The $l$ and the $r$ can be measured in any units of length as long as they are in the same units.

It can be seen that with the above calculations that the figure obtained for $x$ represents the mils in parallel misalignment in a vertical direction. Similar calculations are carried out to ascertain the parallel misalignment in a horizontal direction.

Now let it be assumed that it is desired to obtain the angular misalignment of the two shafts 17 and 18 in a vertical direction. For purposes of convenience, the diagrammatic representation shown in FIG. 5 is utilized. The designations shown in FIG. 5 are very similar to those shown in FIG. 4 except that the positions of the paddle surfaces and the reference surfaces in the B machine has been reversed. In other words, the reference surface 43 at the top for the B-machine is foward of the paddle surface rather than the converse as shown in FIG. 4.

The designation $\alpha_x$ represents the misalignment in a vertical plane of the shaft 18 of the movable machine from a theoretically aligned position from a reference point 73 which is equidistant from the ends of the flexible coupling 19 in a perfectly aligned condition.

Making the same assumptions as were made in conjunction with FIG. 4, $\theta_{x_1}$ is approximately equal to $x/l$ as shown by equation 7. Now solving for $\alpha_x$ as shown in equation 8, it can be seen that $\alpha_x$ is twice the size of $\theta_{x_1}$ because one leg of the triangle for the angle $\theta_{x_1}$ is twice the length of the corresponding leg for the triangle for the angle $a_x$. Therefore, as set forth in equation 8, $\alpha_x$ is approximately equal to $2\theta_{x_1}$ for small angles of $\alpha_x$ and $\theta_{x_1}$.

Now using the theory of similar triangles as set forth above in conjunction with FIG. 4, $\theta_{x_2}$ is approximately equal to $d/r$ for small angles of $\theta_{x_2}$. Then substituting this into equation 8, we find that $\alpha_x$ is equal to $2d/r$ as shown in equation 10 to give a radian measure of $\alpha_x$ in mils per inch. However, it is desired to have a radian measure in mils per foot, the numerator is multiplied by 12 as shown in equation 11.

It is now desirable to ascertain the $d$ average by taking the average of all probe measurements in FIG. 5 as shown in equation 12. Substituting $d$ average into equation 11 gives the average measurement of $\alpha_x$ in mils per foot as shown in equation 13. It has been assumed in equation 13 that $(r)$ is measured in inches. Similar calculations are made to ascertain the angular misalignment in a horizontal plane.

In FIG. 6 the combined angular and parallel misalignment described in conjunction with FIGS. 4 and 5 are shown. It will be noted that in FIG. 6, legs A and B have been identified. These are the locations at which corrections in the alignment will be made for the movable machine or shaft. This can be accomplished by shimming the two spaced apart pedestals 23 carrying the movable shaft 18 as hereinafter described. The dimension $a$ is the distance from the reference point 73 to the center of the first pedestal 23 in a direction away from reference machine 16 and with the letter $b$ representing the distance between the reference point 73 and the center of the second pedestal 23 in a direction away from the reference machine 16.

One practicing the present method would use the information gained from the equations shown in conjunction with FIGS. 4 and 5 to give respectively the parallel misalignment in mils and the angular misalignment in mils per foot in a vertical plane. In order to make the necessary adjustment for aligning the movable shaft 18, it is desirable to combine these two measurements. This is accomplished as shown in FIG. 6 in which $e$ is the correction in a vertical direction for leg A in mils; $f$ represents the vertical correction in mils for leg B; $g$ represents the correction in mils in a horizontal direction for leg A; and $h$ represents the correction in mils in a horizontal direction for leg B.

As can be seen, the dimensions $e$ is obtained in equation 14. The letter $x$ represents the mils in parallel misalignment. The actual mils for the angular misalignment is obtained by taking the angle $\alpha_x$ and multiplying it by the length to leg A measured in feet. The sum of these two represent the total parallel misalignment in a vertical direction. Similar calculations are made for the other dimensions as set forth in equations 15, 16 and 17 in which the dimensions $y$ represent the same distances in a horizontal plane as the distances $x$ represents in a vertical plane. Similarly, the angle $\alpha_y$ represents the same angular measurement in a horizontal plane as the angular measurement $\alpha_x$ represents in a vertical plane.

With the above information, it can be seen that adjustment operations can be carried out on the pedestals 23 by suitable shimming and the like to provide the necessary movement of the pedestals to bring the movable shaft 18 into perfect alignment with the reference shaft 17.

In addition to the parallel misalignment and angular misalignment calculations which have heretofore been made, it is also necessary to make calculations to ascertain the amount of stretch or compression in an axial direction of the flexible coupling 19. The diagram for analyzing these calculations is set forth in FIG. 7 in which the reference surfaces 43 and the paddle surfaces 49 are shown. In the diagram it is assumed that the flexible coupling 19 is in stretch and, therefore, the paddle surfaces 49 on both ends of the coupling are closer to the probes 51 than are the reference surfaces 43. A broken line 76 represents the theoretical position for the paddle surfaces 49 when there is no stretch or compression on the flexible coupling 19. Similarly, the surfaces 43 would also be on the line 76 when the flexible coupling is in this condition. The letters $u$ and $w$ represent the stretch on the respective diaphragms on both ends of the flexible coupling. Normally, the stretch or compression would be divided equally between the two diaphragms if the two diaphragms are of identical compliance. However, if the compliance of the two diaphragms is different, then the dimensions $u$ and $w$ would be proportion to the relative compliances of the two diaphragms. Equation 18 establishes that the total amount of stretch is equal to the sum of $w + u$ which is the combined stretch of the two diaphragms.

$w$ and $u$ are ascertained by obtaining an average by taking one-fourth of the total measurements from the four probes as shown by equations 19 and 20. Combining equations 19 and 20 into 18 gives equation 21 to provide the actual measurement in mils of stretch.

A similar analysis can be utilized for obtaining compression if that should be the case. Using this information, the movable machine would be moved towards the fixed machine by suitable means such as jack screws and the like distance specified by the amount $e$ to eliminate all stretch in the flexible coupling 19. Conversely, if there is compression in the coupling 19, this could be removed by moving the movable machine in an opposite direction with respect to the fixed machine. When all this has been accomplished, the shafts of the two machines will be perfectly aligned.

In FIG. 8, there is shown a schematic diagram of the electronic circuitry which is utilized for taking the information given by the probes 51 and deriving electronically the exact measurements in mils or meters which are to be utilized in correcting the misalignment of the movable shaft 18.

As can be seen in the circuit diagram in FIG. 8, the probes 51 have been shown in the upper left-hand corner with the probes 51 for one of the machines at one end of the flexible coupling being identified as "A" probes and the probes associated with the other end of the flexible coupling connected to the movable being identified as "B" probes. The outputs of these probes are connected to four algebraic amplifiers 81 as shown. As indicated in the schematic diagram, four probe outputs are connected to each of the algebraic amplifiers to provide desired algebraic functions. For example, the first algebraic amplifier 81 is utilized for obtaining the algebraic portion of equation 6 for obtaining the parallel misalignment in a vertical plane. The next lower algebraic amplifier is used for obtaining a similar measurement for angular displacement in a vertical plane. The next algebraic amplifier is utilized for obtaining parallel misalignment in the horizontal plane, and the last algebraic amplifier is utilized for obtaining angular displacement in a horizontal plane. The algebraic amplifiers 81 are of conventional type and each utilizes an operational amplifier 82.

Another algebraic amplifier 84 of a type different from the algebraic amplifier 81 is utilized for providing the algebraic function set forth by equation 21 to obtain stretch and compression information. As will be noted, this algebraic amplifier 84 is connected to the output of all eight trnsducers 51. The algebraic amplifier 84 also includes an operational amplifier 86.

The outputs of the algebraic amplifiers 81 are supplied to sample and hold circuit 87. The sample and hold circuits 87 remember the paddle and reference voltages until the paddles arrive at the same position, at which time the information in the sample and hold circuit is updated. As shown, each of the sample and hold circuits 87 includes a plurality of analog gates 88 identified by gates 1–8 and are driven by signals FIG. 1 to FIG. 8 from the timing logic circuit 91 see (FIG. 8B) in a manner as hereinafter described. The outputs of the gates 88 are supplied to a capacitive storage networks 92 which are connected to operational amplifiers 93 operated in voltage follower modes. The operational amplifier 93 serves to buffer the capacitive network to ensure that the capacitive network will store the information contained therein for relatively long periods of time. The other sample and hold circuit 87 are identical to the one hereinbefore described. An additional sample and hold circuit 96 is provided which is connected to the output of the algebraic amplifier 84 for the stretch and compression information. Only two channels are required in the sample and hold circuit 96 rather than eight channels provided in the sample and hold circuits 87 because all eight channels of information are supplied to the algebraic amplifier 84.

As can be seen from the circuit diagram in FIGS. 8A and 8B, the first four channels of the sample and hold circuit 87 are utilized for storing information on the positions of the paddle surfaces 49, whereas the other four channels are utilized for storing information on the positions of the reference surfaces 43.

The outputs of each of the sample and hold circuits 87 are supplied to a d.c. average and difference amplifier 98. This latter amplifier averages the paddle and reference voltages and thereby obtains the difference of the two averages to give the average measurement $d$ as determined by equation 5. As can be seen, the d.c. average and difference amplifier 98 is a resistive network which feeds into an operational amplifier 99. The other three d.c. average and difference amplifiers are identical to the one hereinbefore described. The output of the sample and hold circuit 96 is supplied to a difference amplifier 101 which simply substracts the two signals supplied to it to give an unscaled $z$ dimension as set forth by equation 21.

Four outputs of the four d.c. average and difference amplifiers 98 are supplied to a single multiplexed scaling circuit 103. This multiplexed scaling circuit consists of a plurality of four gates 104 which have been identified as gates 9–12, respectively, which are of analog type and are driven by signals FIG. 9–12 as indicated which are supplied from a free running clock circuit 106 hereinafter described. The outputs of the gates 104 are supplied to a buffer amplifier 107. The output of the buffer amplifier is supplied to the input of a scaling amplifier 108 which includes an adjustable potentiometer 109 which is adjusted so as to reflect the actual measurement $r$. The output of the scaling amplifier 108 is supplied to the inputs of three different sealing amplifiers 111, 112 and 113. The scaling amplifiers 111, 112 and 113 each include adjustable potentiometers 114, 116 and 117 to permit insertion of the information representative of the dimensions $a$, $l$, $b$. The output of each of the scaling amplifiers 11, 112 and 113 is supplied to a pair of gates 121 and 122 of the type hereinbefore described which are gated by the signals indicated from the free running clock 106. The outputs of the gates 121 and 122 are supplied to capacitive storage networks 123 of the type hereinbefore described. The output of these storage networks are connected to buffer amplifiers 124 which again ensure that the storage networks will retain the information obtained therein for relatively long period of time. The output of each buffer amplifier 124 is supplied to summing amplifiers 126. The outputs of the summing amplifiers 126 are supplied to meters 127. The meters 127 are of a suitable type such as one which will take a voltage input and convert it to visual display in the desired measurement such as mils.

The difference amplifier 101 for the stretch and compression circuitry supplies its output to a scaling circuit 131 which has a fixed gain in accordance with the scale factor of the linear transducers 51. The output of the scaling circuit 131 is supplied to a meter 132 of the type similar to meter 127 and supplies the stretch and compression measurement.

The timing logic circuit 91 includes a NAND gate 136 which receives on its two inputs the outputs of the two timing transducers 56. The NAND gate will supply a 1 whenever either of the two transducers 56 sees a notch in the flexible coupling. This information is supplied to a binary counter which supplies its output to a binary to BCD converter 138. The D gate of the converter 138 is connected to the output of the NAND gate 136 and serves an enable function. There are eight signal outputs provided by the converter 138 which are utilized for timing functions as hereinbefore described. In addition, the timing logic is provided with two additional outputs identified as FIG. 13 and FIG. 14 which are also utilized in conjunction with the stretch and compression measurements.

The free running clock 106 consists of a clock 141 of a conventional type which runs at a relatively slow rate of speed as, for example, 100 Hz. The output from the clock is supplied to a ring counter 142 of a conventional type which is provided with four outputs identified as FIG. 9–12 which are utilized in the circuitry hereinbefore described.

In order to explain more in detail the operation of the circuitry in FIG. 8, let it be assumed that it is desired to obtain the measurement $e$ as shown in equation 14 and to display the same on the meter 127.

As the flexible coupling 19 makes one complete rotation in the machine train, the timing transducer will emit four pulses. These four pulses are supplied through the NAND gate 136 to the binary counter 137 and to the binary to BCD converter 138 to provide signal outputs on FIG. 1–8 in the sequence indicated within a time frame determined by the speed of rotation of the flexible coupling 19. These signals FIG. 1–8 close the gates 1–8 in the sequence 1,5,2,6,3,7,4,8 in the sample and hold circuitry 87 and thus load the storage networks 92 with a voltage which is proportional to the algebraic function in equation 6. This information is stored eight different times in the eight different storage networks 92 with four of them being for the probes 51 observing the paddles 47 and the other four for the probes 51 observing the reference surfaces 43. These eight values for this measurement are averaged in the d.c. average and difference amplifier 98. This information is supplied to gate 9 of the gates 104.

Similar information for the other measurements hereinbefore described are supplied to the other gates 10, 11 and 12. This information is time shared by operation of the gates 104 through signals FIG. 9–12 supplied from the free running clock 106. This information thus is sequentially supplied to the buffer 107 and to the scaling amplifier 108 which inserts the scaling function $l/r$ as hereinbefore described. The only other gate which is closed is gate 16 which is operated by the signal 9 from the free running clock 106 and thus this information passes through the scaling amplifier 112 which inserts therein the scaling function 1 and stores the same in the storage network 123. Thus, there is stored at this time the relationship $l/r$ times the parallel vertical algebra represented by equation 6.

Figures 9, 10:
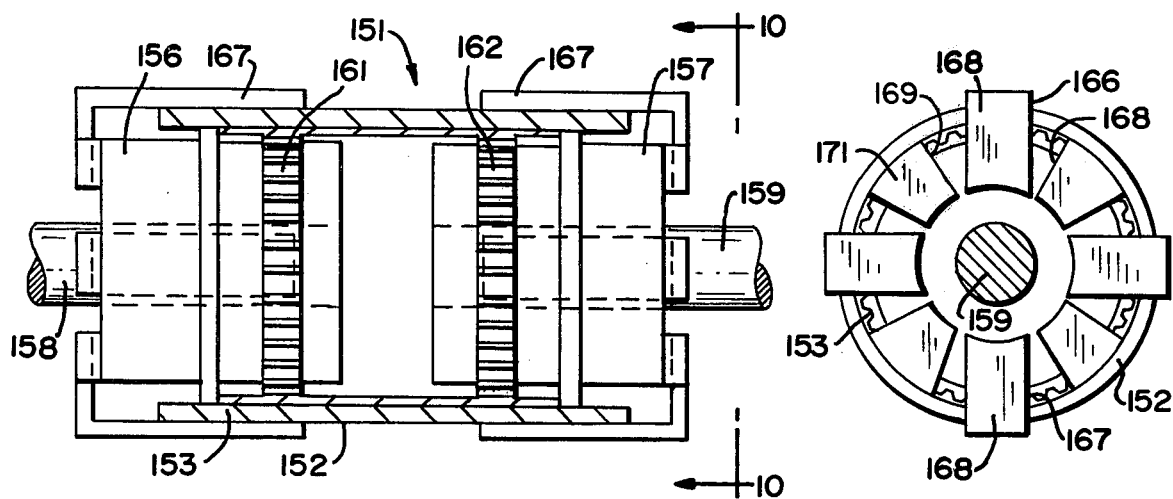
FIG. 9 is a cross-sectional view of a flexible gear-type coupling which has been modified so that it can be utilized in conjunction with the present invention.
FIG. 10 is an end elevational view of the flexible coupling shown in FIG. 9.

As hereinbefore described, the angular vertical information has already stored and is available at gate 10. When signal FIG. 10 is supplied from the free running clock, this information is supplied to the scaling amplifier 108 to insert the scaling function of ¼. This combined information is then supplied through the scaling amplifiers 111 and 113 and through gates 14 and 18 because these gates are both operated by the same FIG. 10. The scaling amplifier 111 inserts the scaling function $a$ whereas the scaling amplifier 113 inserts the scaling function $b$. The information from gate 14 is supplied to the storage network 123 associated therewith to store therein the information $a/r$ times the angular vertical measurement as represented by equation 13. This information which is supplied through gates 14 and 16 and which has been stored in the storage networks 123 is then supplied through the buffer amplifiers 124 to the summing amplifier which combines the two voltages which represent equation 14 to supply a voltage which represents the value $e$ to the meter 127 identified as leg A vertical and as hereinbefore described represents a measurement in mils by which the leg A should be raised or lowered to bring the movable shaft into alignment with the reference shaft.

At the same time that the leg A vertical information is being obtained, the leg B vertical information is also obtained because the information necessary for making this calculation represented by equation 15 has been stored in the storage network 123 associated with gate 18 triggered by signal FIG. 10 and in the storage network 123 associated with gate 16 triggered by signals FIG. 9.

The horizontal information for legs A and B is obtained in a similar manner.

From the foregoing, it can be seen that with the electronic circuitry shown in FIG. 8 it is possible to obtain misalignment measurements. This is made possible because low time constants are associated with the misalignment of rotating machinery hereinbefore described. Thus, the apparatus and circuitry can be placed on the machine and left on the machine while it is in operating condition to observe the machine train continuously.

The circuitry also has the advantage in that it is possible to make slow motion studies with the apparatus so that it can be utilized in conjunction with the initial set-up of a machine train when it is not known whether or not there is a sufficiently satisfactory alignment to permit operation of the machine train. This is made possible because d.c. averaging techniques are utilized with the sample and hold circuitry.

In practice, it has been found that it is difficult, if not impossible, to obtain exactly precise alignment of all of the paddle surfaces 49 so that they all lie in the same plane. Because of this fact, the transducers 51 may note small variations in the positions of the surfaces 49 which could cause jitter or noise in the readout meter 127 at low machine speeds. This has been eliminated by the use of eight channels in the sample and hold circuitry 87. Thus even if a paddle surface is out of alignment with the other possible surfaces, the same information with respect to the paddle surface would be stored in the same storage network. Any aberrations in the spacing of the surfaces because of their being out of alignment are averaged out with the eight channels of sample and hold information.

If it is not necessary to eliminate this jitter or noise with respect to paddle misalingment, the sample and hold circuitry could be simplified to provide only two channels of information such as in the sample and hold circuitry 96. Similarly, the timing logic circuitry could be omitted.

It should be appreciated that in place of the multiplexed scaling circuitry 103 provided, other approaches can be utilized. For example, the four channels of information supplied from the four d.c. average and differential amplifiers instead of being supplied to the multiplexed scaling circuitry would be supplied to four independent scaling circuits each of which included adjustment for the parameters of $r$, $l$, $a$ and $b$. The outputs of the scaling circuits would then be supplied directly to the respective meters 127.

If it is not necessary or desirable to have total misalignment information for both legs A and B, then the alignment information could be read out in the form of parallel and angular misalignment as they exit from the d.c. average and difference amplifiers 98. This information then can be utilized by the operator to calculate the measurements which are represented by equations 14–17 to obtain the actual mils misalignment of legs A and B.

Also, if it is desired to eliminate the electronic circuitry as shown in FIG. 8, it is possible by the use of an oscilloscope to ascertain the necessary information and thereafter make the calculations required to determine the alignment conditions of legs A and B. For example, the oscilloscope could be connected to each of the probes 51 to obtain a visual display of the information being ascertained by the probe. The output would be in the form of a chopped squarewave. By observing the scale on the oscilloscope, it is possible to calculate the differential measurement between the paddle and reference surfaces. In such a case it would be possible to utilize a single probe and to move it into the four different positions to obtain the necessary four measurements on each side of the flexible coupling. At slow roll conditions of the shafts 17 and 18, a d.c. voltemeter could be used to obtain this same information. With this latter method if it is assumed that the paddle surfaces are perfectly aligned, there is no necessity for a timing probe. However, if the paddles are not perfectly aligned which is normally the case, a single timing probe would be required so that it would be possible to ascertain which time sequence of information should be added and which should be subtracted in the algebraic equations.

In the electronic circuitry shown in FIG. 8, the two timing probes 56 are required in order to be able to ascertain when the machine starts whether a paddle surface or a reference surface is being observed. By utilizing phase locked loop techniques, it is possible to utilized a single probe in which the phase locked loop would supply a pulse representing the geometrical timing for the position of the other probe. This is possible because it is known that the notch is aligned with the paddle. The phase locked loop could also be utilized to provide additional signals so that it would only be necessary to provide one notch in the flexible coupling. It should be pointed out that the notch could be any place on the rotating shafts of the machine train. Also, instead of a notch, a projection could be used. All that is needed is something that can be observed on the rotating shaft train to provide a timing signal.

In certain instances it may be very desirable to ascertain whether or not a diaphragm is being stressed beyond its elastic limit or that it is operating within usable stress levels. This can be ascertained by measuring the gap distance between the probes 51 and the paddle surfaces using the reference surfaces 43 as a reference and to translate this directly into stress information utilizing a scaling constant $k$ which can be derived empirically or theoretically from the diaphragms themselves. Thus, the information supplied directly from the transducers 51 themselves can be utilized for making such an analysis.

It should be appreciated in conjunction with the foregoing that it is possible in a machine train that most of the misalignment which is seen by a flexible coupling can be borne by one of the diaphragms and, therefore, it is all the more important to make the hereinbefore described measurements to ascertain whether or not the diaphragms are being stressed beyond their usable limits.

It should be pointed out that in conjunction with the foregoing description of the invention it has been assumed that the axis of the shaft is disposed in a horizontal direction. It should be appreciated that the same considerations would apply even though the shaft is in a vertical direction or at any other angular position. Similarly, it should be appreciated that the yoke for mounting the probes could be twisted or mounted askew with respect to the axis and still the same type of information would be supplied.

It should be appreciated that if misalignment will only occur in one direction, that the number of linear transducers can be reduced by one-half as well as the accompanying circuitry.

As hereinbefore explained, the present invention has application to other flexible couplings other than of the diaphragm type. Thus, there is shown in FIGS. 9 and 10 a gear-type flexible coupling 151. The coupling 151 consists of a hollow cylindrical body 152 which is provided with inwardly radically extending internal gear teeth 153 extending axially thereof. First and second hubs 156 and 157 are mounted within the body 152 with hub 156 being adapted to be secured to one shaft which can be identified as the reference shaft 158 and the other hub 157 being secured to the other shaft which can be identified as the movable shaft 159. The hubs 156 and 157 have spur gears 161 and 162 formed integral therewith and which are adapted to mesh with the teeth 153 provided in the body 152 and to engage the same. In addition, the spur gears 161 and 162 are adapted to move longitudinally of the teeth 153 provided in the body 152 to accommodate dual movement of the shafts. A plurality of paddles 166 are provided which extend over one end of the hub 157 and are affixed to the body 152 by suitable means such as bracket 167. The paddles 166 have surfaces 168 the positions of which are adapted to be sensed by proximity probes or transducers of the type hereinbefore described. Similarly, there are provided members 169 secured to the exterior of the hub 157 which have planar surfaces 171 which generally lie in the same plane as the surfaces 168 and which serve as reference surfaces, the positions of which are also sensed by the proximity probes.

In this gear type of coupling, the torque forces are transmitted by the gearing hereinbefore described. This type of flexible coupling will accommodate parallel misalignment as well as angular misalignment to some degree. In addition, the flexible coupling will accommodate axial misalignment to a greater degree than that which can be accommodated by the flexible type diaphragm coupling. Since reference surfaces and paddle surfaces have been provided on this gear type flexible coupling which can be sensed in the same manner as with the diaphragm type coupling hereinbefore described, it is readily apparent that the present invention is also applicable to gear type couplings. It also should be appreciated that the present invention is applicable to other types of flexible couplings such as ones which use O-ring or other elastomer elements.

Figures 11, 12:
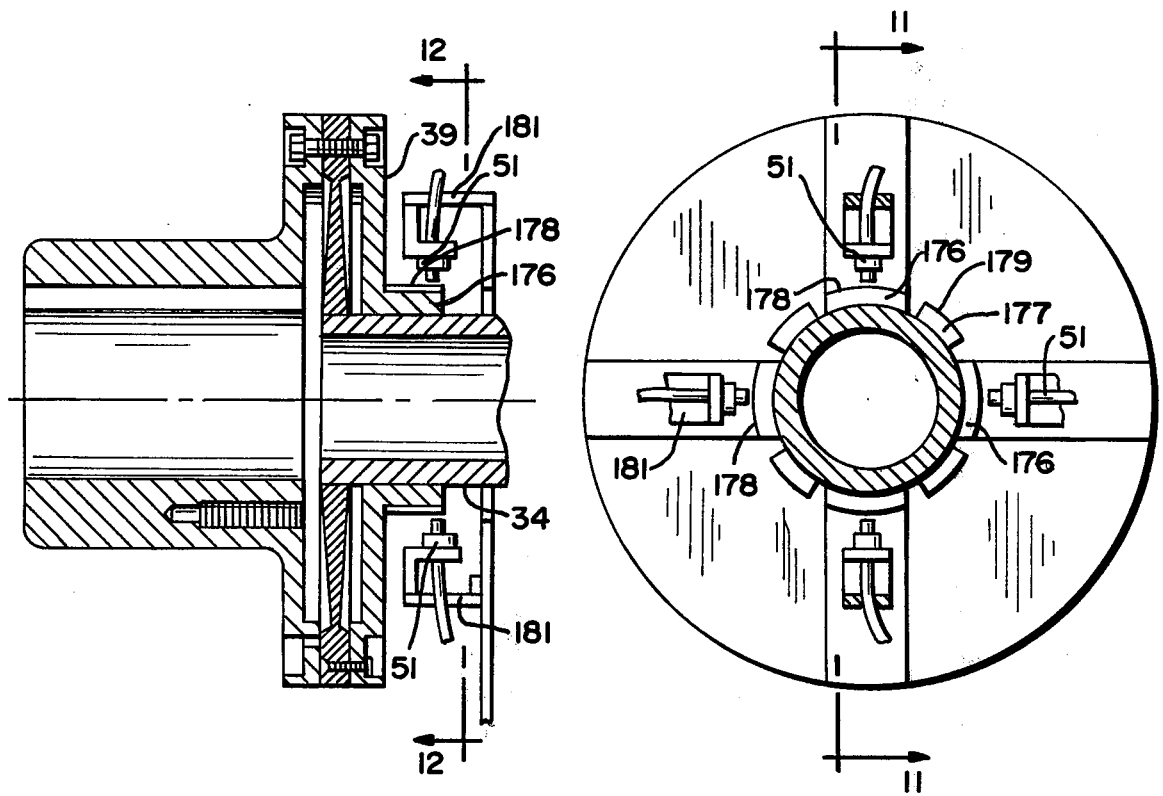
FIG. 11 is a cross-sectional view taken along the line 11—11 of FIG. 12 showing a flexible coupling with alternative paddle means.
FIG. 12 is a cross-sectional view taken along the line 12—12 of FIG. 11.

It should be appreciated that although in conjunction with the foregoing embodiments the proximity measurements were measured in an axial direction, that these same measurements can be accomplished in a radial direction by proper construction of the paddles. Such a typical construction is shown in FIGS. 11 and 12. As shown in FIGS. 11 and 12, a portion of a flexible diaphragm type coupling is shown and is constructed in the manner hereinbefore described. However, in lieu of providing cut-outs as hereinbefore described, the guard is provided with a plurality of four feet 176 which extend outwardly in a direction which is parallel to the axis of the center tube 34 and generally surround the tube 34. They are circumferentially spaced around the tube so that the center lines of the paddles are spaced 90° apart. In addition, there are provided projections or tabs 177 which are mounted on the center tube 34 adjacent the paddles 176. The paddles 176 have arcuate surfaces 178 and the tabs 177 have arcuate surfaces 179 which are in circumferential alignment when the diaphragms of the coupling are in a natural or unstressed condition. With such an arrangement radially disposed probes 51 are provided which are carried by brackets 181. With such an arrangement, it can be seen with parallel misalignment and angular misalignment, the paddle surfaces 176 will be shifted with respect to the surfaces 179 carried by the shaft to give indications similar to that which are obtained when axial movement was observed. It should be appreciated that the radial arrangement of the probes 51 is not able to ascertain axial misalignment, i.e., stretch and compression of the type hereinbefore described. However, this type of an arrangement of the probes 51 does have the ability to accommodate large amounts of axial movement of the hubs of the flexible coupling such as which may occur in conjunction with a gear type coupling.

In the event a single element flexible coupling is utilized, it is only necessary to make the one measurement, i.e. the measurements which are presently carried on one end of the flexible coupling.

It should be appreciated that in conjunction with the foregoing apparatus and method various fail-safe features can be provided. For example, out-of-tolerance indicators can be provided for the transducers 51 to indicate when one or more of the same are operating out-of-tolerance. Similar warning devices can be provided to indicate amplifiers operating in saturation, loss of power supply voltages and other malfunctions such as breakage of cables to transducers. Additionally, it is readily apparent to one skilled in the art that if desired additional circuitry can be provided to cause automatic shut-down of the machine train in the event one or more undesirable conditions occur. Alternatively, automatic warning to operators can be provided. In addition, the information which is supplied can also be utilized for automatically controlling the alignment.

It should be appreciated that although the probes have generally been mounted 90° apart that the probes can be mounted at different angles, it merely being necessary that the probes be spaced apart a sufficient distance so that two degrees of freedom of movement measurements can be made. Utilizing angles different than 90° merely complicates the mathematics which can be easily taken into account in a computer. However, in order to obtain mutually exclusive equations as hereinbefore set forth, it is necessary to provide four different measurements.

It is apparent from the foregoing that there has been provided a new and improved shaft alignment apparatus and method whereby the alignment between any pair of machines with rotating shafts in any machine train having a flexible coupling therebetween can be measured with the machines at rest and during start-up and during all running conditions and on shut-down. The apparatus provides indications of the axial motion of this machine both steady state and dynamically and both relatively and absolutely. From the foregoing it can be seen that the apparatus also provides the net coupling hub motion of each machine due to any dynamic motion of each rotor such as that due to fixed bows, thermal bows, unbalance bows and other action at rotative speed in a forward direction and also that due to any other action at other than rotative speed foward direction such as caused by oil whirl, rexcitation of balance resonances and other actions that create shaft motions with the above having the result of tilting the plane of the coupling hub of each rotor of the machine away from the plane normal to the axis of rotation for the machine train. The information obtained with the apparatus makes it possible to protect the machines connected by the flexible coupling and to protect the coupling from exposure to various motions and stresses which are beyond its capabilities. With the apparatus, readings can be provided for first aligning the machine pair properly before start-up, parallel alignment, angular alignment and axial spacing. This same information can be obtained during running of the machine train and also in shut-down.

The apparatus also is the type which can be used in conjunction with a machine train and after alignment has been completely removed from the machine train. Alternatively, if desired, the apparatus can be left on the machine train to provide continuous monitoring to give operator warnings which automatically shut down the machine or to automatically cause movement of the movable machine with respect to the reference machine to eliminate any misalignment.

I claim:

1. In an alignment apparatus for a pair of machines in a machine train having first and second rotating shafts interconnected by a flexible coupling, the flexible coupling having at least one member connected to one of the shafts and being capable of accommodating at least some misalignment of the first and second shafts, one of said first and second shafts being considered as a reference shaft and the other of said first and second shafts being considered as a movable shaft, the alignment apparatus comprising means adapted to be carried by the shafts having surfaces spaced apart circumferentially with respect to the axis of rotation of the shafts which represent the orientation of one of said shafts and serve as reference surfaces, paddle means adapted to be carried by the flexible coupling having surfaces interposed between said reference surfaces and spaced apart circumferentially with respect to the axis of rotation of the shafts and representing the orientation of said one member of the flexible coupling, and probe means for sensing the position of said reference surfaces and said last named surfaces during rotation of the same to determine whether said shafts are placing on said member a force which is outside of the useful operating range of the member in the flexible coupling.

2. Apparatus as in claim 1 wherein said probe means is of the non-contacting type and provides an electrical output and means connected to said probe means providing a visual read-out.

3. In an alignment apparatus for a pair of machines in a machine train and having first and second rotating shafts interconnected by a flexible coupling, the flexible coupling being of a type having first and second spaced apart members connected to the first and second shafts and being capable of accommodating at least some misalignment of the first and second shafts, one of said first and second shafts being considered as a reference shaft and the other of said first and second shafts being considered as a movable shaft, the alignment apparatus comprising means adapted to be carried by the shafts having surfaces spaced apart circumferentially with respect to the axes of rotation of the shafts which represent the orientation of said first and second shafts and serve as reference surfaces, paddle means adapted to be carried by the flexible coupling having surfaces spaced apart circumferentially with respect to the axes of rotation of the shafts and representing the orientation of said first and second spaced apart members of the flexible coupling, probe means for sensing the positions of said reference surfaces and said last named surfaces, timing means for ascertaining the rotation of at least one of said shafts in said machine train, and means coupled to said probe means and to said timing means for determining at least one of the following including parallel misalignment of said first and second shafts, angular misalignment of said first and second shafts and compression and stretch of said flexible coupling.

4. Apparatus as in claim 3 wherein said first and second members of said flexible coupling are in the form of diaphragms.

5. Apparatus as in claim 3 wherein said first and second members of said flexible coupling are in the form of movable gears.

6. Apparatus as in claim 3 wherein said paddle means includes at least four separate paddle members which are spaced 90° apart on each end of the flexible coupling and wherein said probe means includes at least four probes for each end of the coupling, said probes being spaced approximately 90° apart and being capable of sensing the positions of said surfaces.

7. Apparatus as in claim 6 together with means connected to the output of the probes for developing signals representing an average of the relative positions of the surfaces, sample and hold means for receiving the average signals and for holding the same for a period of time and means for combining said signals with different parameters of the machine train to provide an indication of the desired alignment parameter.

8. Apparatus as in claim 7 wherein the indication of the alignment parameter is visual.

9. Apparatus as in claim 7 wherein the movable shaft is supported by two legs identified as leg A and leg B spaced at different distances from said flexible coupling together with means giving an indication of the distances leg A should be moved in horizontal and vertical directions and the distances leg B should be moved in horizontal and vertical directions to eliminate parallel misalignment of the first and second shafts.

10. Apparatus as in claim 7 together with visual means for displaying the amount the movable shaft must be moved to eliminate stretch and compression from the flexible coupling.

11. Apparatus as in claim 3 wherein said reference surfaces and said last named surfaces lie in planes generally perpendicular to the axes of rotation of the shafts.

12. Apparatus as in claim 3 wherein said reference surfaces and said last named surfaces lie in a generally circular path generally parallel to the axes of rotation of the shafts.

13. Apparatus as in claim 3 wherein said timing means includes at least one indicium movable with one of the shafts and means for sensing the indicium.

14. Apparatus as in claim 3 wherein the means coupled to said probe means and to said timing means includes electrical means for determining a distance representing the parallel misalignment of the shafts.

15. Apparatus as in claim 14 wherein said distance is specified vertical and horizontal directions.

16. Apparatus as in claim 3 wherein said means coupled to said probe means and to said timing means includes electrical means for determining a distance representing the angular misalignment of the shafts.

17. Apparatus as in claim 16 wherein said distance is represented in two separate values with respect to two different points on the movable shaft spaced at different distances from the flexible coupling.

18. Apparatus as in claim 3 wherein said means coupled to the probe means and to said timing means includes electrical means for determining a distance representing the compression and stretch of the flexible coupling.

19. In a method for aligning a pair of machines in a machine train having first and second shafts interconnected by a flexible coupling, the flexible coupling being of a type having first and second spaced apart members coupled to said first and second shafts and being capable of accommodating at least some misalignment of the first and second shafts, one of said first and second shafts being considered as a reference shaft and the other of said first and second shafts being considered as a movable shaft, the steps of sensing the orientation of at least one of said shafts by carrying out the sensing of rotating surfaces carried by said one shaft in at least two locations spaced apart circumferentially with respect to the axis of rotation of said one shaft, sensing the orientation of at least one of said members of the flexible coupling by carrying out the sensing of rotating surfaces carried by carrying out the sensing of rotating surfaces carried by said coupling in at least two locations spaced apart circumferentially with respect to the axis of rotation of said coupling, using the sensed information to determine at least one of the following including parallel misalignment of the first and second shafts, angular misalignment of the first and second shafts and compression and stretch of the flexible coupling.

20. A method as in claim 19 together with the step of displaying the sensed information to give a visual display of the sensed information.

21. A method as in claim 19 together with the step of calculating the distance representing the parallel misalignment of the shafts.

22. A method as in claim 19 together with the step of calculating distances with reference to two spaced points on the movable shaft representing angular misalignment of the shafts.

23. A method as in claim 19 together with the step of calculating the distance representing the compression and stretch of the flexible coupling.

24. A method as in claim 19 wherein said sensed information is determined while the shafts are being slowly rotated.

25. A method as in claim 19 wherein the sensed information is ascertained during normal rotation of said shafts.

26. A method as in claim 19 together with the step of visually displaying the sensed information and aligning the movable shaft with the reference shaft using the visual information.

27. A method as in claim 19 wherein the sensing of the orientation of at least one of the shafts is carried out at four locations spaced approximately 90° apart and wherein the sensing of the orientation of one of the members of the flexible coupling is carried out at four separate locations spaced approximately 90° apart together with the step of sensing the rotation of at least one of said shafts.

28. A method as in claim 27 wherein the sensing of the shaft is utilized to provide at least two timing signals which are spaced in time with respect to each other wherein one of the timing signals is related to the sensing of the orientation of at least one of the shafts and the other of the timing signals is related to the sensing of the orientation of at least one of the members of the flexible coupling.

29. A method as in claim 19 wherein the orientation of both the first and second shafts is sensed and wherein the flexible coupling has first and second members secured to the first and second shafts and wherein the orientation of both of said first and second members is sensed.

30. In a method for aligning a pair of machines in a machine train having first and second shafts interconnected by a flexible coupling, the flexible coupling being of a type having first and second spaced apart members coupled to said first and second shafts and being capable of accommodating at least some misalignment of the first and second shafts, one of said first and second shafts being considered as a reference shaft and the other of said first and second shafts being considered as a movable shaft, the steps of sensing the orientation of at least one of said shafts by carrying out the sensing of rotating surfaces carried by said one shaft in at least two locations spaced apart circumferentially with respect to the axis of rotation of said one shaft, sensing the orientation of at least one of said members of the flexible coupling by carrying out the sensing of rotating surfaces carried by said coupling in at least two locations spaced apart circumferentially with respect to the axis of rotation of said coupling and using the sensed information to ascertain whether said shafts are placing on said member a force which is outside of the useful operating range of the member in the flexible coupling.

31. In an apparatus of the character described, first and second machines having a first and second rotating shafts, a flexible coupling interconnecting said first and second rotating shafts, the flexible coupling having at least one member connected to one of the shafts and being capable of accommodating at least some misalignment of the first and second shafts, one of said first and second shafts being considered as a reference shaft and the other of said first and second shafts being considered as a movable shaft, means carried by the shafts having surfaces spaced apart circumferentially with respect to the axis of rotation of the shafts which represent the orientation of one of said shafts and serve as reference surfaces and additional surfaces spaced apart circumferentially with respect to the axis of rotation of the shafts which represent the orientation of the other of said shafts and probe means for sensing the position of said reference surfaces and said last named surfaces during rotation of said shafts to determine whether said shafts are placing a force on said member of the flexible coupling which is outside of the useful operating range of said member in the flexible coupling.

* * * * *